US011739770B2

(12) United States Patent
Kline

(10) Patent No.: US 11,739,770 B2
(45) Date of Patent: Aug. 29, 2023

(54) VARIABLE OUTPUT, HYDRAULIC DRIVE SYSTEM

(71) Applicant: Robert D. Kline, Fort Worth, TX (US)

(72) Inventor: Robert D. Kline, Fort Worth, TX (US)

(*) Notice: Subject to any disclaimer, the term of this patent is extended or adjusted under 35 U.S.C. 154(b) by 0 days.

(21) Appl. No.: 17/294,412

(22) PCT Filed: Dec. 11, 2019

(86) PCT No.: PCT/US2019/065822
§ 371 (c)(1),
(2) Date: May 16, 2021

(87) PCT Pub. No.: WO2020/123726
PCT Pub. Date: Jun. 18, 2020

(65) Prior Publication Data
US 2022/0018366 A1 Jan. 20, 2022

Related U.S. Application Data

(60) Provisional application No. 62/778,098, filed on Dec. 11, 2018.

(51) Int. Cl.
F03D 9/25 (2016.01)
F04B 17/02 (2006.01)
(Continued)

(52) U.S. Cl.
CPC ............. F15B 15/04 (2013.01); F03D 9/25 (2016.05); F03D 9/28 (2016.05); F04B 1/0413 (2013.01);
(Continued)

(58) Field of Classification Search
None
See application file for complete search history.

(56) References Cited

U.S. PATENT DOCUMENTS 3,314,594 A * 4/1967 Rietdijk .................... F25B 9/06
92/60
4,745,846 A * 5/1988 Eickmann ............... F01B 19/00
92/45
(Continued)

FOREIGN PATENT DOCUMENTS

CN 202273819 U * 6/2012
DE 19781873 B4 * 4/2006 ............ F25B 49/022
(Continued)

OTHER PUBLICATIONS

Machine Translation of EP-1157210, attached to Patent Document Listed Above (Obtained from USPTO Search, 2022 Clarivate Analytics) (Year: 2022).*
(Continued)

Primary Examiner — Essama Omgba
Assistant Examiner — Geoffrey S Lee
(74) Attorney, Agent, or Firm — Guy V. Manning

(57) ABSTRACT

A radial hydraulic wind turbine pump system incorporates: 1) a concentric, multi-lobed cam that produces multiple strokes per revolution; 2) a piston profile that maximizes the number of large-diameter pistons arranged radially around the centerline axis; 3) a flexible piston base 50 with internal oil flow; 4) hydraulically connected cylinders which counter displacement issues raised in item 2 above; 5) variable stroke capability leading to infinitely variable output and the ability to disengage unneeded cylinders from the cam; 6) integral reservoir and accumulator capacity; 7) compact, external pressure and return manifolds; 8) axially-oriented pressure and return manifolds 60, 70, and 9) a hydraulic reservoir and pressure tank integrated into the body of the pump.

13 Claims, 7 Drawing Sheets

(51) Int. Cl.
  *F04B 1/0413* (2020.01)
  *F04B 9/04* (2006.01)
  *F04B 1/0538* (2020.01)
  *F04B 53/14* (2006.01)
  *F03D 9/28* (2016.01)
  *F15B 15/04* (2006.01)

(52) U.S. Cl.
  CPC ............ *F04B 1/0538* (2013.01); *F04B 9/042* (2013.01); *F04B 17/02* (2013.01); *F04B 53/14* (2013.01)

(56) References Cited

U.S. PATENT DOCUMENTS

| | | | |
|---|---|---|---|
| 5,145,324 A | | 9/1992 | Dickies et al. |
| 5,156,005 A | * | 10/1992 | Redlich .................... F25B 9/14 318/811 |
| 5,224,411 A | | 7/1993 | Fillion |
| 8,074,450 B2 | * | 12/2011 | Nies ........................ F03D 15/20 92/72 |
| 8,358,024 B2 | * | 1/2013 | Tsutsumi ................. F03D 9/28 290/55 |
| 8,622,719 B2 | | 1/2014 | Tsutsumi et al. |
| 8,890,345 B2 | * | 11/2014 | Oosterling ................ F03D 9/17 290/44 |
| 9,074,578 B2 | | 7/2015 | Souply et al. |
| 9,328,720 B2 | | 5/2016 | Caldwell et al. |
| 9,739,266 B2 | | 8/2017 | Salter et al. |
| 2011/0148111 A1 | * | 6/2011 | Oosterling ................ F03D 9/25 290/44 |
| 2012/0060685 A1 | * | 3/2012 | Salter ..................... F03D 80/88 92/128 |
| 2015/0354537 A1 | * | 12/2015 | Mukai .................... F04B 1/0538 92/13.4 |
| 2020/0080541 A1 | * | 3/2020 | Bourgault ................ F03D 15/10 |

FOREIGN PATENT DOCUMENTS

| | | | | |
|---|---|---|---|---|
| EP | 1157210 B1 | * | 9/2004 | ............. F01B 1/062 |
| EP | 2749768 A1 | * | 7/2014 | ............. F03D 15/00 |
| EP | 2757262 A1 | | 7/2014 | |
| EP | 2770204 A1 | | 8/2014 | |
| EP | 2995374 A2 | | 12/2015 | |
| EP | 3318752 A1 | * | 5/2018 | ............. F03D 15/00 |
| EP | 3318753 A1 | | 5/2018 | |
| EP | 2757262 B1 | | 8/2018 | |
| GB | 2477997 A | * | 8/2011 | ............. F03B 15/02 |
| GB | 2482879 A | | 2/2012 | |
| JP | 2014214683 A | * | 11/2014 | ............. F03C 1/0409 |
| WO | WO-2012073280 A1 | * | 6/2012 | ............. F03B 13/26 |

OTHER PUBLICATIONS

Machine Translation of JP-2014214683, attached to Patent Document Listed Above (Obtained from USPTO Search, 2022 Clarivate Analytics) (Year: 2022).*

Machine Translation of CN-202273819, attached to Patent Document Listed Above (Obtained from USPTO Search, 2022 Clarivate Analytics) (Year: 2022).*

Machine Translation of DE-19781873, attached to Patent Document Listed Above (Obtained from USPTO Search, 2022 Clarivate Analytics) (Year: 2022).*

WO 2014/054072 (Mitsubishi Heavy Industries, Ltd) Apr. 10, 2014 (Apr. 10, 2014), entire document, esp. Figs. 1, 6.

WO 2014/024231 A1 Eilers, et al. (Mitsubishi Heavy Industries, Ltd [JP]) Feb. 13, 2014 (Feb. 13, 2014), entire document, esp. Figs. 3, 6, Paras. [0052]-[0054].

WO 2013/030874 A1 Salter, et al. (Mitsubishi Heavy Industries, Ltd [JP]) Mar. 3, 2013 (Mar. 1, 2013), entire document, esp. Figs. 1, 4, Paras. [0050]-[0053].

WO 2012/022954 A1 Rampen, et al. (Artemis Intelligent Power, Ltd [GB]) Feb. 23, 2012 (Feb. 23, 2012), entire document, esp. Fig. 1b, p. 31 line 31-p. 34 line 20.

EP Appl No. 19896566 Kline—EP Partial Search Report dated Dec. 10, 2021 (dated Dec. 10, 2021), entire document.

* cited by examiner

VARIABLE OUTPUT, HYDRAULIC DRIVE SYSTEM

BACKGROUND OF THE INVENTION

1. Field of the Invention

This invention relates generally to mechanical power trains and particularly to devices for conveying rotational motion to generators for generating electrical power. More particularly, this invention relates to a hydraulic pump for transforming low speed rotation to hydraulic energy which can drive a motor coupled to an electric generator. Still more particularly, this invention relates to a hydraulic energy converter which can replace mechanical gearboxes in wind turbines.

2. Description of Related Art

Wind turbines, as a means of converting mechanical energy into electricity, are inherently inefficient. Wind turbine airfoils interact with only a fraction of the air column that passes through their sweep and of that fraction capture less than half. System components bleed off even more, which means that only 10-30% of the power of the wind is ever actually converted into usable electricity. Yet, system components are rated for maximum output driven by expected rotational speeds, whether or not those speeds are realized. When they are not, legacy turbines necessarily operate at sub-optimal efficiency. A need exists for means to tailor system components to the available wind energy.

Gear boxes in wind turbines couple between the turbine blades and an electric generator housed in the turbine hub, or racelle. The gear boxes convert the low speed, high torque rotational energy from the turbine blades into high speed rotational energy for driving the generator. Such gear boxes, however, are comparatively rigid, mechanical linkages constantly buffeted by wind speed changes, ambient temperature changes and inclement weather, and are chronically in need of service and repair. Their expected live span is measured in fractions of the expected service life of wind turbines. A need exists for a coupling between the wind turbine blades and the electricity generator which lasts as long as the other components of the system.

Hydraulic Alternative

The hydraulic drive system of the present invention offers significant improvements over these constraints. Hydraulic technology offers a single-in, multiple-out design option, offering wind turbine designers the choice of using either a single- or multiple-generator design. Because it is a variable-output drive, it is able to capture and efficiently convert a much wider range of wind energy into electrical energy.

Converting the energy of a rotor shaft turning at fifteen to twenty rpm to the energy of a generator shaft turning at over fourteen hundred rpm is an unconventional hydraulic application. For a wind turbine application, it offers a superior alternative but requires an unconventional design. It must replace the 92:1 reduction ratio found in most turbine gearboxes with a hydraulic equivalent and do so in a confined space of the turbine hub or nacelle.

This reduction ratio is accomplished through a volumetric difference between the hydraulic pump and the hydraulic motor. A hydraulic drive system creates the same reduction ratio as a fixed-gear system by producing proportionately more output volume than the volume capacity of the motor. For instance, a pump with a volume capacity of 96 cubic feet per revolution produces 96 revolutions in a motor with a volume capacity of 1 cubic foot per revolution. At shaft speeds of 15 rpm, this hydraulic drive would produce 1,440 output rpm. Creating this volumetric difference in a space comparable to that used by a wind turbine hub imposes design constraints of its own.

Hydraulic Energy Formula

The formula used for calculating the energy capacity of a hydraulic drive system is the same as the one used to determine the horsepower necessary to drive a hydraulic system:

$$P_{HP}=(p*q)/1714$$

where $P_{HP}$=Power (expressed in horsepower)

p=pressure in psi q=hydraulic flow in gallons per minute.

As this formula shows, hydraulic energy (and by extension, the electrical energy a hydraulic drive system can generate) is a function of hydraulic flow and pressure. By keeping the pressure constant and varying the rate of flow, a hydraulic drive system can efficiently capture and convert a wide range of wind energy.

The design challenge is to develop a hydraulic drive system that meets the constraints of physics, economics, space, and function. It must generate sufficient flow at conventional pressures and varying rotation speeds and torque levels to spin heavy generator loads at a high consistent speed. Because of the pressures required (greater than 1500 psi) and slow rotation speed, a piston pump (positive displacement) seems to be the best option.

Piston type hydraulic pumps come in two types: axial and radial. Axial pumps are by far the most common and the rotating piston drum resembles a revolver barrel. Radial pumps are much less common and resemble a World War Thera aircraft engine. Because of the configuration of the radial design, with pistons radiating outward from a central cam, the radial piston pump offers the greatest output in the most compact space.

Radial pistons can be grouped in "banks," which can be "stacked." A small conventional radial pump typically has a single bank of three to five pistons. Some are stacked with two banks which double the output. Axial pumps cannot be stacked this way, and the larger the piston diameter, the greater the drum diameter needed to accommodate the number of pistons required. Of course, larger pistons in a radial pump increases the diameter of the radial pump as well, but the way the pistons are oriented minimizes the effect. To produce the pressure required to drive industrial size generators, a hydraulic system will need large pistons, and lots of them.

Using the formula above and solving for a 2,011 hp (1.5 MW) capacity, the required hydraulic flow is 1,378 gpm at a motor pressure of 2,500 psi. Once the flow and pressure are known, one can configure a system to produce that flow. The present invention opts for a 12-piston-per-bank, 3-bank design; for a total of 36 pistons. For this capacity, the pistons would need to be 8.75 inches in diameter with a 1.65-inch stroke (6 strokes per revolution) at 15 rpm. One having ordinary skill in the art will recognize, of course, that other geometric choices exist for producing this volume, but the specified configuration produces the most volume in the least space. The instant radial pump design preferably measures about 5 feet in diameter and about 4.5 feet deep. At 20 rpm rotor speed, this system should produce 2,713 hp (2 MW).

Small increases in piston diameter and stroke can significantly increase drive system capacity without increasing the overall size of the system. A piston with a 9.75 inch diameter and stroke of 2 inches produces 3,063 hp (2.28 MW) at 15 rpm and 4,084 hp (3 MW) at 20 rpm. The flexibility to support this range of power outputs with the same components is a major advantage of a hydraulic system. Standard component usage means lower manufacturing costs. Conceivably, the entire industry could be supported by only two systems: one that goes up to 3 MW and another that exceeds 3 MW.

SUMMARY OF THE INVENTION

A radial hydraulic wind turbine pump system incorporates: 1) a concentric, multi-lobed cam that produces multiple strokes per revolution; 2) a piston profile that maximizes the number of large-diameter pistons arranged radially around the centerline axis; 3) a flexible piston base 50 with internal oil flow; 4) hydraulically connected cylinders which counter displacement issues raised in item 2 above; 5) variable stroke capability leading to infinitely variable output the ability to disengage unneeded cylinders from the cam; 6) integral reservoir and accumulator capacity; 7) compact, external pressure and return manifolds; 8) axially-oriented pressure and return manifolds 60, 70, and 9) a hydraulic reservoirand pressure tank integrated into the body of the pump.

BRIEF DESCRIPTION OF THE DRAWINGS

The novel features believed characteristic of the present invention may be set forth in appended claims. The invention itself, as well as a preferred mode of use and further objects and advantages thereof, will best be understood by reference to the following detailed description of an illustrative embodiment when read in conjunction with the accompanying drawings, wherein:

DESCRIPTION OF A PREFERRED EMBODIMENT

Figure 1:
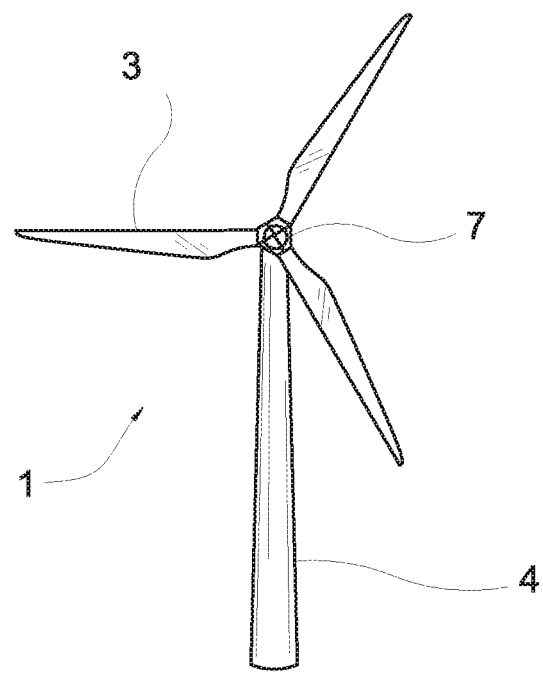
FIG. 1 shows a typical wind turbine.
Figure 2:
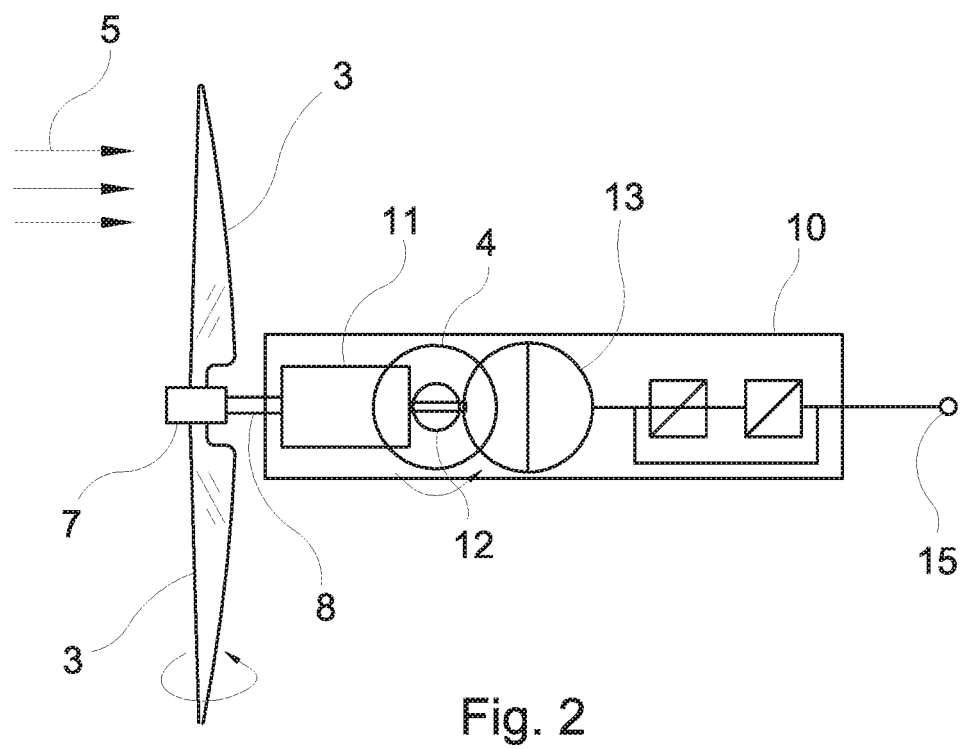
FIG. 2 shows a schematic of the wind generator of the wind turbine of FIG. 1.

Referring now to the figures, and particularly to FIGS. 1-2, a typical wind turbine 1 installation includes a mast, or tower 4 atop which is positioned rotor hub 7 from which three blades 3 extend radially to intercept incident wind 5 and spin rotor hub 7 and rotor shaft 8. In such manner, wind turbine 1 converts nominally horizontal wind energy into mechanical rotation of shaft 8 to turn turbine generator 13 and produce electricity which is passed through connection 15, typically an insulated cable (not shown) extending downward through mast 4 to a buried grid system (not shown) of a neighboring electric utility company. Yaw drive 12 responds to dynamometers and wind direction sensing vanes (neither shown) to determine wind 5's primary direction and to rotate hub 7 horizontally atop mast 4 to place the plane of blades 3 perpendicular to wind 5 and thereby to maximize the energy capture of turbine 1.

Turbines 1 commonly are disposed with multiple other turbines 1 arrayed in wind "farms" across windswept hillsides, ravines, lakes, oceans and the like where wind 5 has reliable speed and frequency to make investment in turbines 1 worthwhile. One having ordinary skill in the art will recognize, however, that even single, isolated turbines 1 may be found in solitary emplacements intended to capture relatively cost-free wind energy and supply it to a localized facility. Though wind turbine 1 is depicted having three blades 3 displaced 120 degrees apart and arrayed substantially coplanar around hub 7, as do the vast majority of turbines 1, one having ordinary skill in the art also will recognize that any number of blades 3 for turbine 1, or other wind-capturing mechanisms such as columnar blade systems (not shown), may be employed without departing from the scope of the present invention.

As discussed in more detail below and above, legacy wind turbines 1 commonly have a weak link, that of gearbox 11 which converts relatively slow axial rotation of shaft 8 into high speed generator rotation capable of generating the 50-60 Hertz of sinusoidal, alternating current voltage necessary to synchronize with the local electric grid to which it almost always must connect through grid connection 15. Because it is a relatively rigid, mechanical drive train between hub shaft 8 and generator 13, gearbox 11 commonly does not last more than five years without having to be repaired or replaced.

Referring now also to FIGS. 3-6, a particular embodiment of the present invention comprises a hydraulic coupling between shaft 8 and generator 13, eliminating the rigidity of mechanical gearbox 11. Additionally, as discussed in more detail below, the present invention provides the flexibility to tailor generator 13 demands upon the system to available wind 5, lending efficiencies to the system which gearbox 11 cannot provide.

Figure 3:
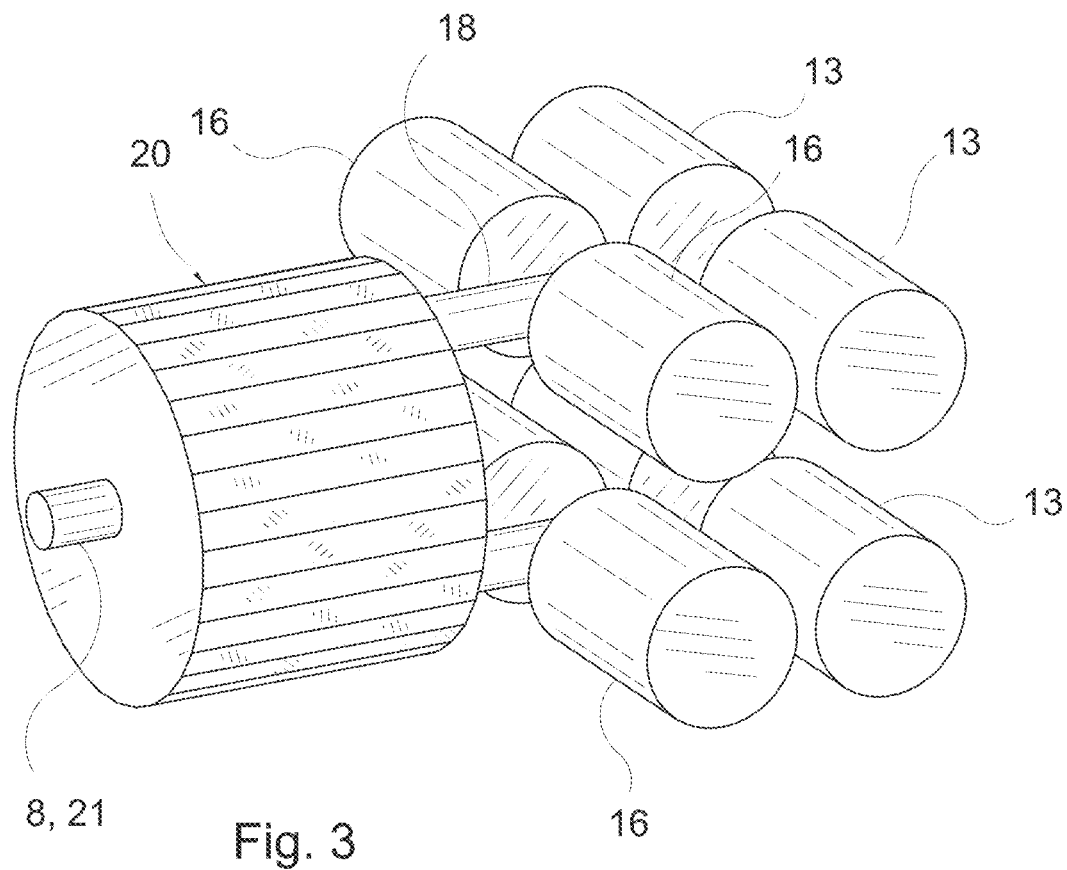
FIG. 3 shows a simplified schematic of the hydraulic drive system of the present invention.
Figure 4:
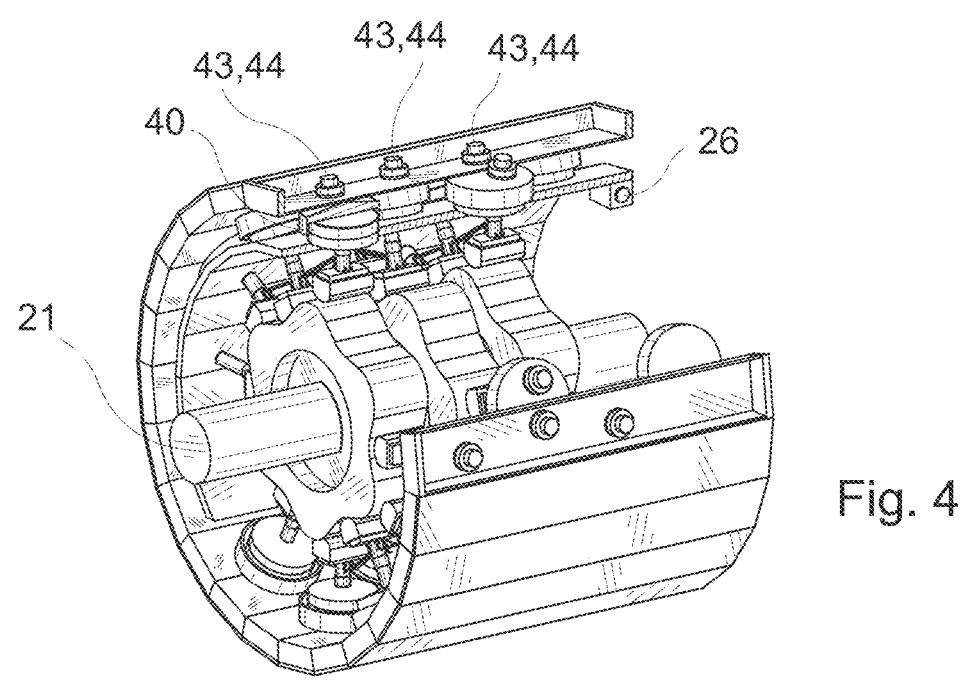
FIG. 4 details in partial cutaway, perspective view the internal mechanisms if a particular embodiment of the hydraulic pump portion of the invention shown in FIG. 3.
Figure 5:
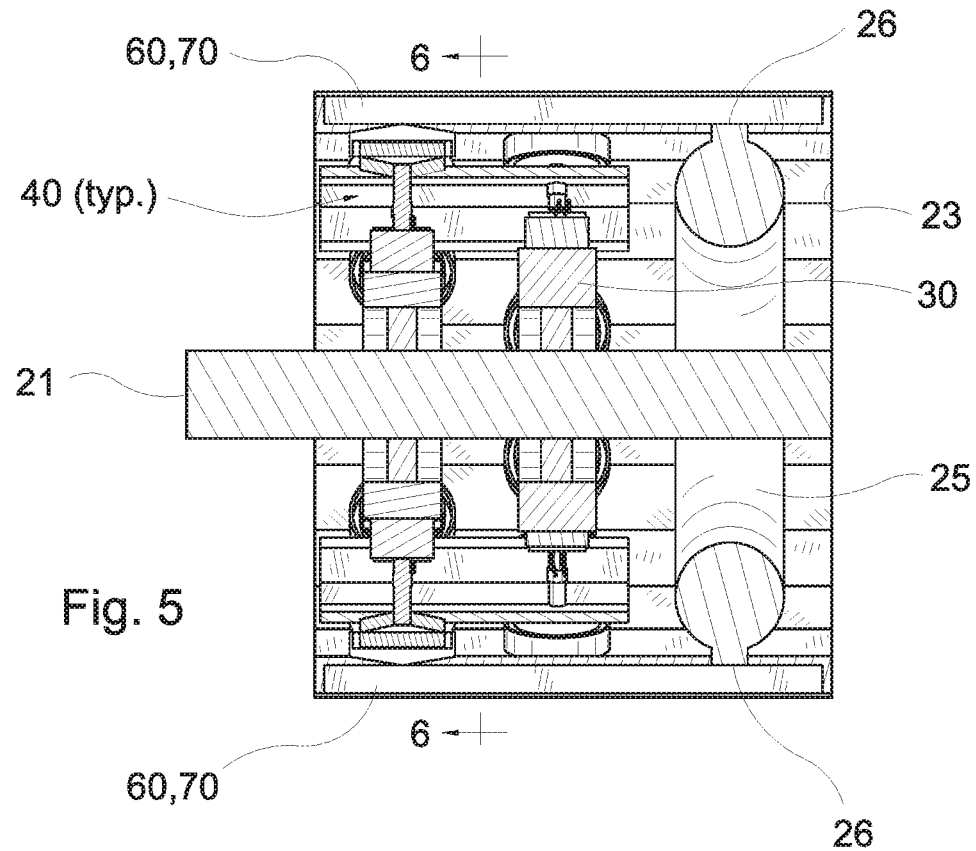
FIG. 5 details in plan view the internal components of a particular embodiment of the present invention
Figure 6:
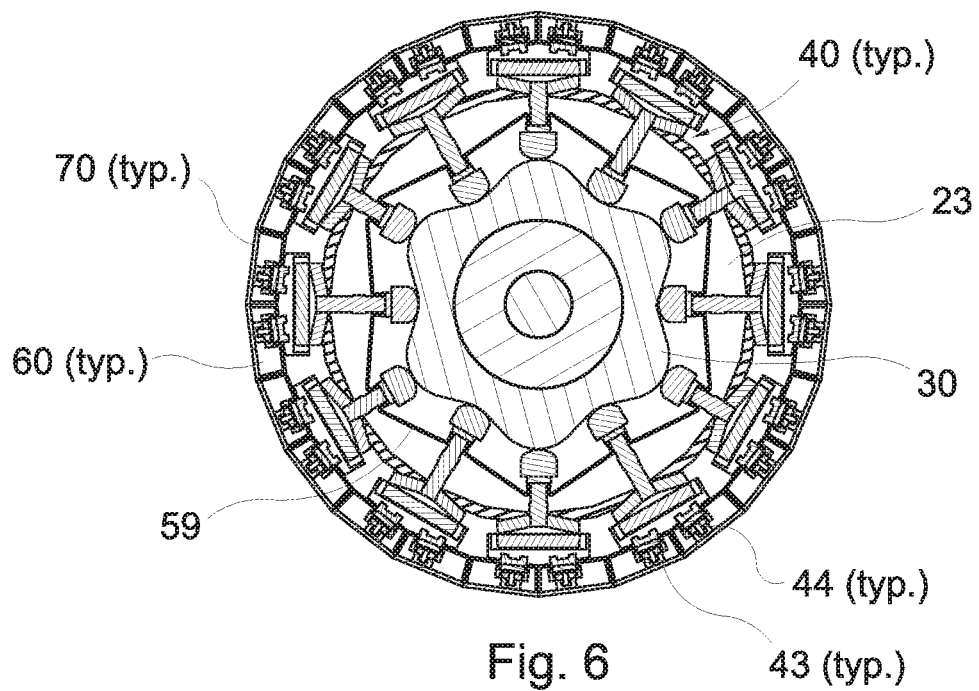
FIG. 6 shows in front elevational view, as indicated in FIG. 5, another view of the internal components of the embodiment of FIG. 5.
Figure 7:
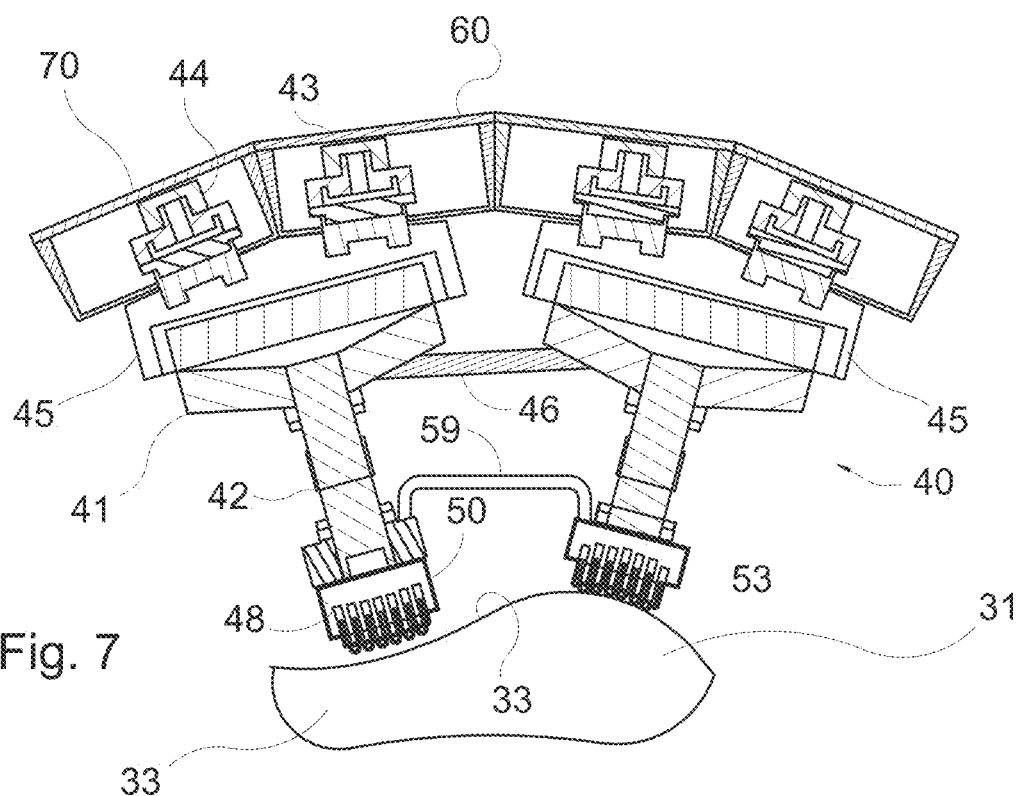
FIG. 7 details a hydraulically coupled pair of pistons of the present invention.
Figure 8:
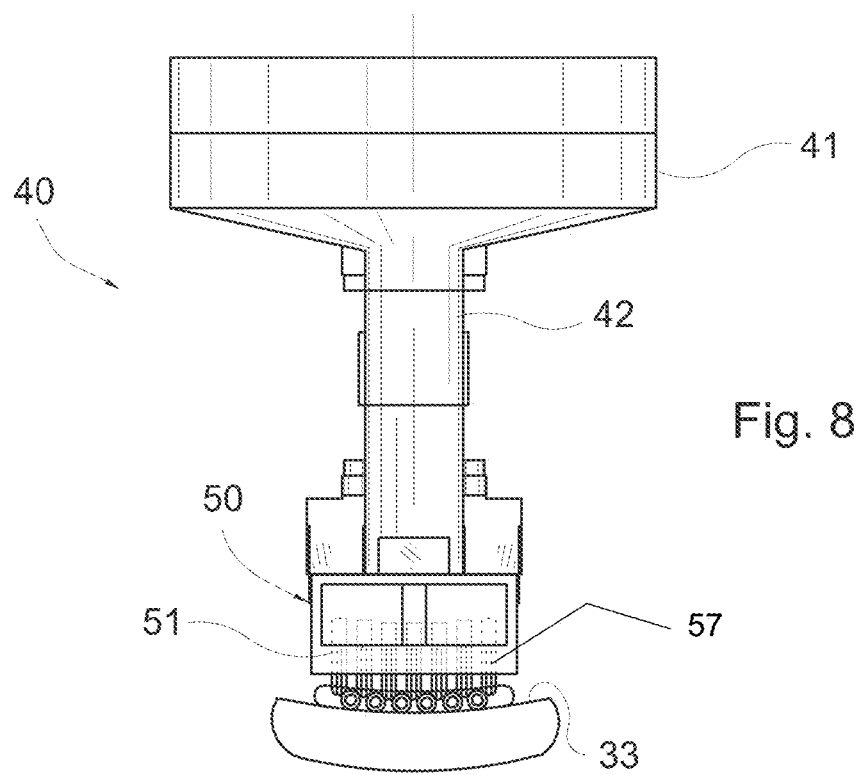
FIG. 8 details a single piston of the present invention.
Figure 9:
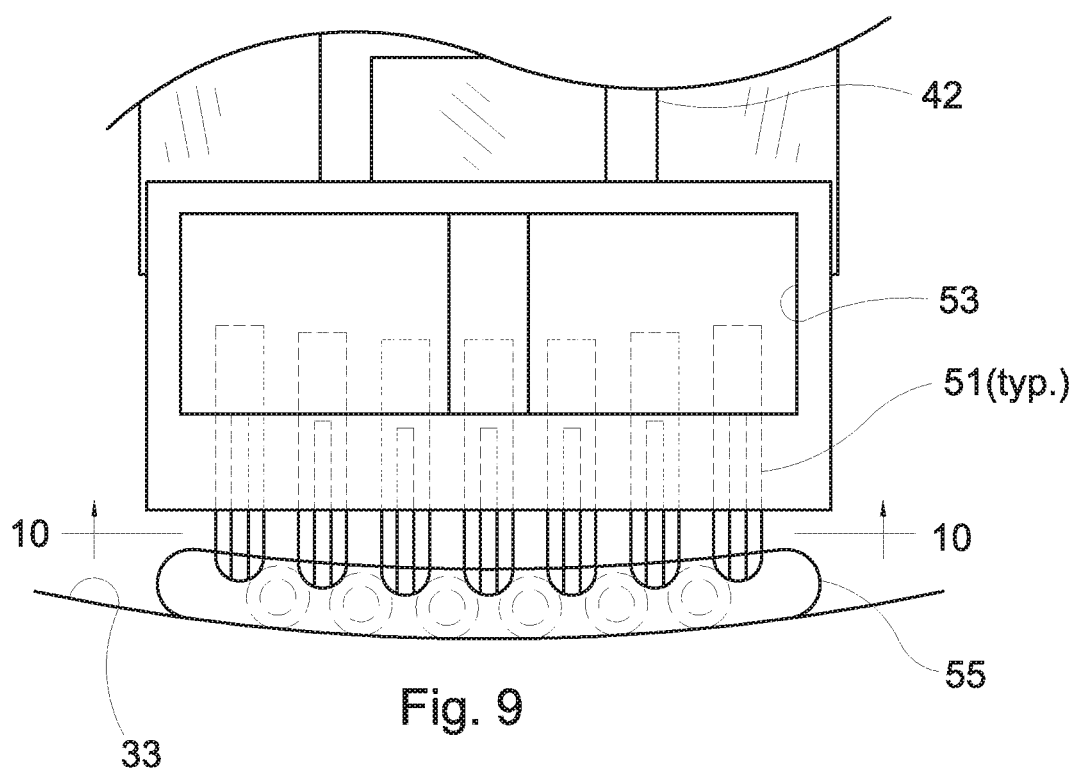
FIG. 9 details a close-up of the piston-cam interface employed in the present invention.
Figure 10:
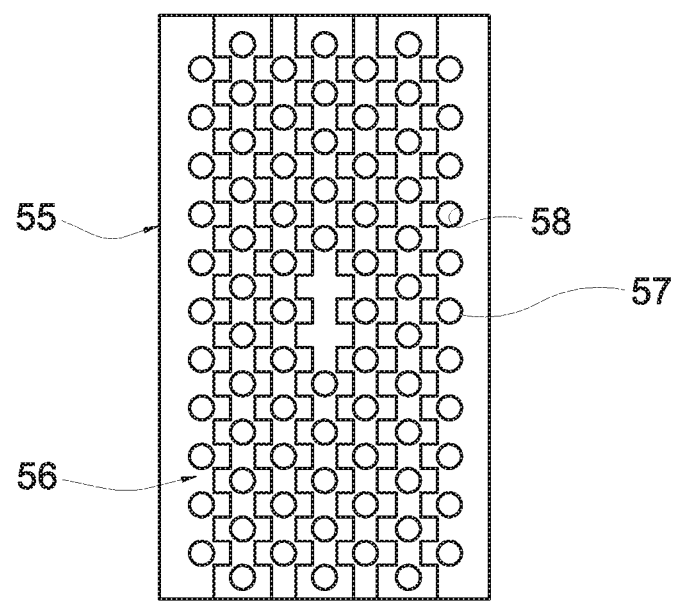
FIG. 10 details a flexible mat employed in the piston-cam interface of the present invention.
Figure 13:
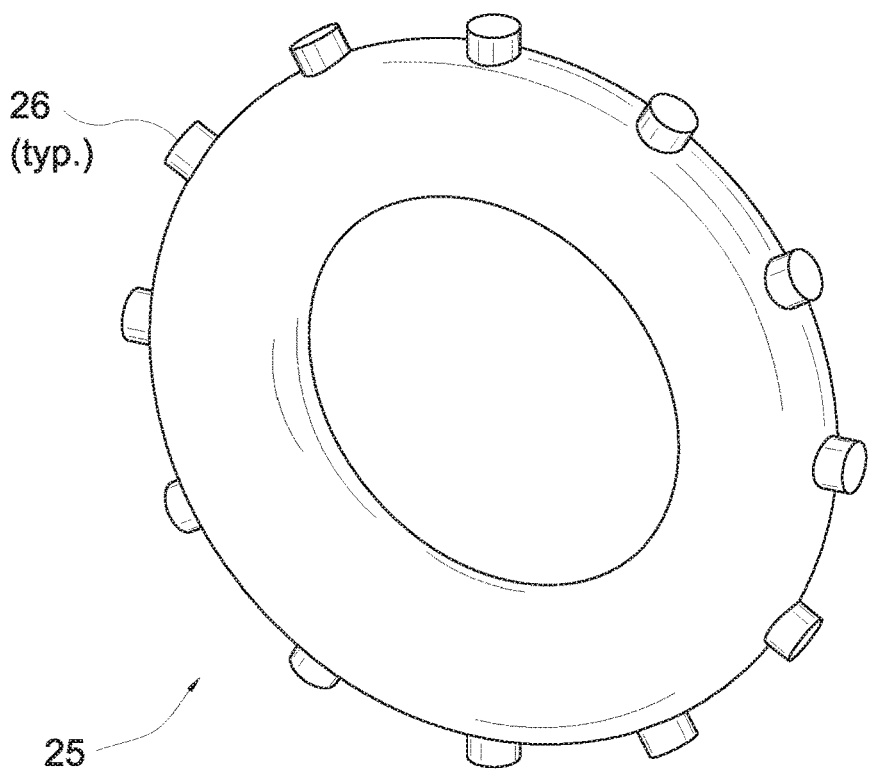
FIG. 13 illustrates a pressure tank that may be utilized with the present invention.

As best seen in FIGS. 3 and 4, and discussed in more detail below, the present invention comprises cylindrical pump 20 coaxial with multi-lobed cam 30, including camshaft 21 mechanically coupled directly to hub rotor shaft 8. Thus, blades 3 drive rotation of cams 30 within stationary pump 20 disposed in place of gearbox 11 within nacelle 10. Radially arrayed around cam 20, pistons 40 produce hydraulic pressure within pressure tank 25 (FIG. 13) from which oil circulates to drive hydraulic motors 16 to turn generators 13 (FIG. 3). As discussed in detail below, pump 20 includes means by which the pressure output, and thereby energy requirements, of pistons 40 may be controlled to match the amplitude and reliability of wind 5.

Integral Reservoir and Pressure Tank

The present invention integrates two components which are typically separate in a hydraulic circuit into the body of pump 20: fluid reservoir 23 and pressure tank 25. Because pistons 40 are oriented radially, hydraulic fluid flows into and out of each cylinder 45 through one-way valves 43, 44 attached to ports in cylinder 45. Fluid travels through fluid manifolds 60, 70 (discussed below) along the external circumference of pump 20. Pressure manifolds 60 take pressurized fluid (from pistons 40 on their power stroke) to pressure tank 25 located inside reservoir 23. Return manifolds 70 transmit unpressurized fluid back to pistons 40 on their return strokes. Each cylinder 45 is connected to both pressure 60 and return 70 manifolds, so they must sit side-by-side. This configuration means that pressurized fluid and return fluid ports must also be aligned radially. By extending pump 20 body casing farther than needed to house cylinders 45, reservoir cavity 23 is created in which donut-shaped, or toroidal pressure tank 25 mounts with fluid receptacles 26 aligned radially around its perimeter. Similar fluid ports can be aligned into reservoir 23 for return fluid. This also allows core cavity 23 of pump 20 in which camshaft 21 is mounted to be used as reservoir capacity.

External Axial Manifolds

As mentioned above, hydraulic fluid forms a circuit by flowing outward from cylinders 45 to pressure tank 25 and onward to motors 16 which drive generators 13, the fluid returning from motors 16 to reservoir 23 and back to cylinders 45. Each cylinder 45 is capped by a cylinder head which incorporates two one-way check valves 43, 44; one each for influent flow and for effluent flow. Connected to each cylinder head 41 are two manifolds: one for pressurized fluid 60 and one for unpressurized return fluid 70. Manifolds 60, 70 create a direct path from cylinders 45 to pressure tank 25 and reservoir 23. Manifolds 60, 70 are both functional and aesthetic; they transmit fluid and maintain a smooth cylindrical shape to drive pump 20. Manifolds 60, 70 will most likely be made of steel and machined to a smooth, rounded internal surface (pressure vessels need to be rounded to avoid corners which can crack).

Multi-Lobe Concentric Cam

Conventional radial pumps use an offset, counterweighted circular cam (not shown) that produces one stroke per revolution. Multi-lobe, concentric cam 30 of the present invention produces multiple strokes per revolution. The embodiment illustrated below is designed for three banks of twelve pistons each in which half of pistons 40 are at top dead center and the other half are at bottom dead center. One having ordinary skill in the art will recognize that pump 20 could accommodate any practical even number of pistons 40 without departing from the scope of the present invention.

Such a multiple lobe design accommodates the slow rotation velocity of pump 20. A significant number of large pistons 40 are necessary to create the volume required to transmit the amount of energy needed to maintain conventional system pressures. Spacing them radially around the longitudinal axis of pump 20 allows for a significant number of pistons 40 to be placed in each bank.

The strokes of pistons 40 must remain relatively short to avoid crowding on cam 30. Therefore, each piston 40 must provide multiple strokes per rotation to pump the necessary volume. Also, the present invention design allows for multiple sets, or "banks," of cylinders 45 with cams 30 rotated to stagger the space between power stroke cycles and to smooth the flow of pressurized fluid. Cams 30 are designed to bear the load while reducing weight and allowing space for hydraulic fluid to flow around and through pump 20.

Flexible Base

Referring now also to FIGS. 7-10, piston assembly 40 is composed of large diameter top 41, small diameter rod 42, and flexible base 50 that pivots on surface 33 of cam 30 (FIGS. 4-12). Each piston 40 bears thousands of pounds of total force. Base 50 of piston 40 spreads the back pressure force from generator 13 carried into piston 40 over a broad footprint. The larger the footprint of piston base 50, the less force each square inch will have to bear. This reduces wear and promotes lower failure rates and longer life. Piston base 50 rides along alternately convex and concave undulating surface 33 and therefore must be flexible enough to mirror the undulating surface yet strong enough to bear the load.

Piston base 50 is a rectangular assembly slightly smaller than the width of surface 33 of cam 30. It comprises two-part knuckle/shoe assembly in which a plurality of knuckle pistons 51 hold shoe 55 in place and allow base 50 to pivot as it rides along surface 33 of cam 30. Knuckle pistons 51 conduct hydraulic fluid from footer fluid reservoir 53 through conduits 57 into a bearing race in which shoe 55 rides. Shoe 55 incorporates a semi-circular bearing surface 56 that rides in the bearing race. Shoe 55's bearing surface 56 is perforated with small holes 58 along its axial surface which couple to conduits 57 and allow hydraulic fluid pumped into knuckle pistons 51 to travel through shoe 55 onto surface 33 of cam 30. The fluid is pumped with enough force to lift shoe 55 off surface 33 of cam 30, permitting it to glide along on a thin layer of oil, minimizing friction between cam 30 and piston 40. Pressure line 59 couples between footer fluid reservoirs 53 of bases 50 on two adjacent pistons 40 to equalize pressure in those pistons 40.

Hydraulically Connected Cylinders

Pistons 40 are contained in cylinders 45 that are hydraulically connected via ports 43, 44 above the large diameter top 41. Piston 40 resembles more of an actuator piston than a pump piston because it has a piston head 41 and piston rod 42. The unconventionality of piston 40's profile creates a displacement issue. When piston 40 is forced up on its power stroke by cam lobe 31, a void is formed under piston head 41 which has to be filled.

Figure 11:
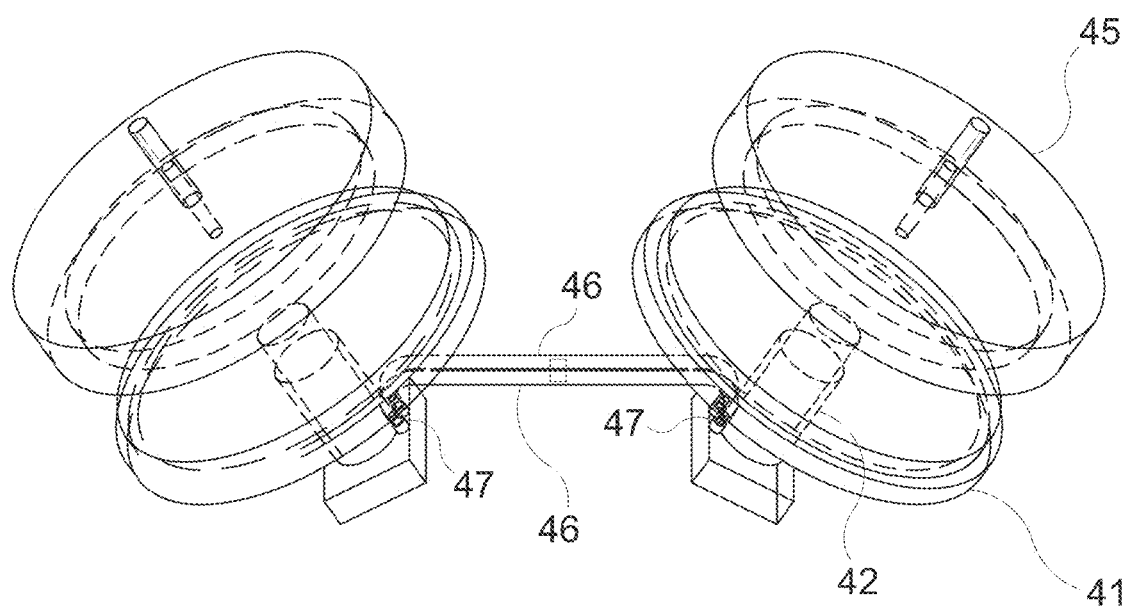
FIG. 11 shows the oil port connectivity between the hydraulically coupled pair of pistons of FIG. 7.
Figure 12:
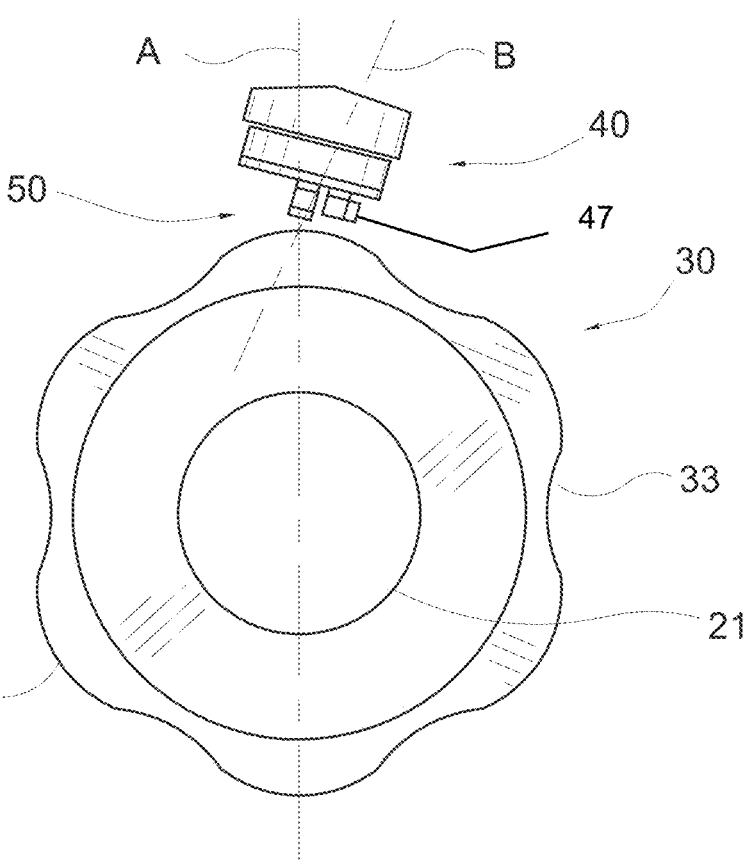
FIG. 12 show the orientation of a typical piston relative to a transverse axis of the multiple lobed cam of the present invention.

Referring now also to FIG. 11, cylinders 45 are connected together in pairs, enabling sharing of the fluid beneath piston heads 41 between two cylinders 45 through transfer pressure line 46. When first (power) piston 40 is forced up by the cam 30, the void formed beneath it creates negative pressure which draws fluid from beneath second (return) piston 40 and pulls the latter downward toward cam surface 33. Return fluid from ports 44 also exerts positive pressure on return piston 40 to force it downward as well.

Piston Positioning System

Pump 20 operates without the need for seals or piston rings. Piston top, or head 40 is a few thousandths smaller than cylinder 45's interior walls. Thus, a small amount of fluid will slip around the side of power piston 40 due to the pressure differential between the top and bottom sides of piston top 41 on its power stroke. Slippage will prevent return piston 40 from descending the same distance as power piston 40 ascends since some of the volume above power piston 40 will transfer beneath it and prevent that amount of fluid from transferring from return piston 40 cylinder 45. This cycle will continue back and forth until both pistons eventually work their way up to the top of their respective cylinders 45 and remain there ineffectively.

It is preferable that the position of piston 40 be monitored and any slippage compensated for by drawing an amount of fluid from beneath piston 40 equivalent to the amount slipping around it. The piston 40 position slippage can be calculated by installing a piston position monitor, such as a Honeywell linear transducer 47 in piston head 41 and employing a controller (not shown) to calculate any difference in the length of travel between two paired pistons 40. Since piston 40 on its power stroke is driven by cam 30, power piston 40 data serves as a control set. If return piston 40's length of travel is less than power piston 40's, the differential must be due to slippage. Calculating and compensating for slippage requires a subsystem called the Piston Positioning System (PPS) and enables infinitely variable output by hydraulically controlling the length of each piston 40's stroke.

Figure 14:
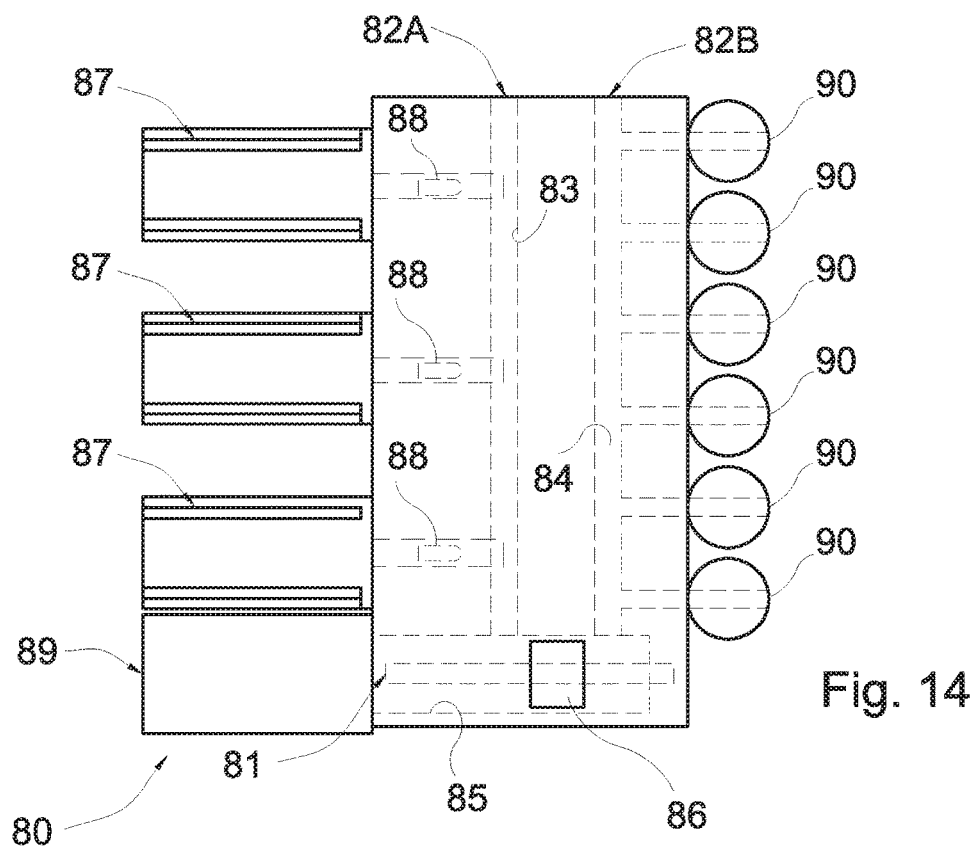
FIG. 14 shows a schematic of a piston position system for use with the present invention.

Referring now also to FIG. 14, PPS 80 comprises machined PPS manifold 81 which circulates hydraulic fluid to control precisely the position of pistons 40 during operation. Since pistons 40 are, in effect, suspended in fluid, the amount of fluid below and above them can be very precisely modified either downward or upward depending upon the direction of circulation through manifold 81. If circulation is created to compensate for slip, then fluid can be drawn from beneath return piston 40, lowering its position in cylinder 45 and allowing more return fluid into return cylinder 40. If the direction of circulation is reversed, however, fluid can be added beneath pistons 40 and withdrawn from above them, lifting both pistons 40 in their cylinders 45. Depending on how much fluid is added, pistons 40 may either ride higher in cylinders 45, thereby shortening their strokes, or be disengaged from cam 30 altogether.

The ability to control pump 20's output is both desirable and valuable, because one of the main design goals of the present invention is to maximize efficiency by minimizing the amount of energy bled from main rotor shaft 8 by internal drive systems of turbine 1. In lower wind conditions; when turbine 1 is producing less than maximum output, pump 20 maintains maximum efficiency by reducing the amount of heavy fluid it moves through the system and the amount of friction produced between pistons 40 and cam 30. Moving heavy fluid and overcoming friction requires energy; and eliminating unnecessary friction and mass movement reduces energy loss, leaving more energy to be converted into electricity at the generator 13. The ability to vary pump 20's output means pump 20 can be configured for maximum efficiency at every practical wind velocity, a major advantage over gearbox 11. Coupled with the ability to engage multiple smaller generators 13 independently and simultaneously—thereby reducing friction at lower wind velocities even further—a variable output, multi-generator hydraulic drive system 20 maximizes turbine 1's total efficiency at all usable wind velocities. This approach is superior to conventional wind turbine 1 that maximizes the efficiency of a single component at a nominal wind velocity but drops off below that velocity and disappears altogether above it, since turbine 1 cannot utilize velocities outside its rated output capacity.

Continuing now with FIG. 14, PPS manifold 81 is machined from a solid piece of aluminum. Two channels A, B run lengthwise from reservoir 23 ports 82A, 82B at one end to large channel 85 running laterally near the opposite end thereof. Large channel 85 incorporates custom, bi-directional impeller 86 coupled to electric motor 89 that creates circulation in either direction. Both ports 82A, 82B at the end of the axial channels A, B connect to lines (not shown) running to internal reservoir 23. Adjacent to and extending from both axial channels A, B, lateral ports connect to lines connected to each of cylinders 45. Axial A-channel 83 and the laterals extending therefrom modulate the fluid volume beneath pistons 40, while axial B-channel 84 and the laterals extending therefrom modulate the fluid volume above pistons 40. A-channel 83 uses three (3) laterals since fluid is modulated for pairs of pistons 40 together. As discussed above, hydraulic connection is desirable for the fluid below pistons 40 but not above them. B-channel 84 uses six (6) laterals because each line goes to a separate cylinder head 45. Further, A-channel 83 flow is controlled by needle valves 88 controlled by stepper motors 87 driven by the automated control system (not shown). Each needle valve 88 has a fitting connected to one piston 40 pair, because each will have a unique slip.

For slip compensation, circulation will flow from A-channel 83 to B-channel 84 and be discharged back into reservoir 23. There is no need to discharge the output to cylinder head 41 since return manifold 70 will have sufficient fluid to balance the volume. However, for piston 40 disengagement, either full or partial, circulation will travel from B-channel 84 to A-channel 83, and B-channel 84 laterals will need to open to pull fluid from cylinder head 41 to give piston 40 room to rise as volume is added to the bottom from A-channel 83. For partial disengagement, B-channel 84 lateral valves 90 close when piston 40 reaches its desired location and circulation is restored from A-channel 83 to B-channel 84. For full disengagement, B-channel 84 side lateral valves 90 remain open and circulation remains from B-channel 84 to A-channel 83, exerting constant mild pressure below pistons 40 to keep them disengaged.

Each manifold 60, 70 controls three (3) pairs of cylinders 45. To keep force balanced on camshaft 21, cylinder 45 pairs are grouped in threes and spaced 120 degrees apart. There are therefore six (6) independently controlled groups of cylinders 45 in a 36-cylinder pump, each with its own PPS 80.

Summary

There are no known hydraulic systems in use at this time for wind turbines 1. The challenges and limitations as well as the strategy for overcoming those challenges and limitations are described above. The present invention overcomes those challenges and limitations and provides an innovative turbine 1 drive mechanism which increases efficiency and lowers costs, making wind energy production more economical and feasible.

Hydraulic drive will impact the wind turbine industry in at least four ways: it reduces up-tower mass, lowers necessary tower structural mass, eliminates the need for expensive mid-life replacement, and contributes to total system efficiency by configuring the drivetrain to match the power captured by the rotor. The ability to reduce the mass of the drivetrain for lighter winds makes the system more efficient across the entire operating range.

In a hydraulic system the force is carried by lightweight hydraulic fluid. Steel weighs approximately 490 lbs. per cubic foot while hydraulic fluid weighs only 49 lbs. Capacity can therefore be increased with hydraulic drives by increasing the volume pumped through the system and at greater pressures without significant increases in mass.

The power-to-weight ratio of the present invention is highly advantageous. Conventional gearboxes for a 8 MW turbine weighs around 86 metric tonnes (95 imperial tons). By contrast, configuring the present invention for 8 MW capacity would require a device weighing less than 10 tons. Some items typically machined from aluminum would most likely have to be made of steel instead, but increasing the motor pressure to 5,000 psi would increase capacity significantly without a proportional increase in mass.

Hydraulic systems are generally known for their durability and reliability. The simplicity of the system in terms of number of moving parts is conducive to long life. The minimal metal-to-metal contact compared to a gearbox means low wear in system components. In hydraulic systems, part failure is usually high-pressure hoses rather than mechanical components. The expected pressure within the cylinder is less than 500 psi, which is a very low-stress load on the pump, eliminating micro-fractures in the cylinder walls caused by high pressure. With regular replacement, hose failures during operation should be minimal and both easy and inexpensive to repair.

While the invention has been particularly shown and described with reference to preferred and alternate embodiments, it will be understood by those skilled in the art that various changes in form and detail may be made therein without departing from the spirit and scope of the invention. For example, pump 20 has been discussed in the context of a hydraulic link between wind turbine rotor 7 and generator 13, it could also be used for other applications, such as transmissions for the driveshafts ocean-going ships which encounter rough seas and unreliable back pressure from their propeller screws.

I claim:

1. A hydraulic drive pump for a wind turbine, the wind turbine having a nacelle disposed atop a support tower, said nacelle surrounding and containing at least one generator coupled to a generator drive motor coupled to a longitudinal turbine shaft extending outside said nacelle to couple to an air foil, the hydraulic drive pump comprising channeling means surrounding and coaxial with said longitudinal turbine shaft for channeling pressurized hydraulic fluid between said generator drive motor and said hydraulic drive pump, a plurality of annular cams coaxial with and mechanically coupled to said longitudinal turbine shaft, each of said plurality of annular cams having a cam perimeter surrounding and radially distal said longitudinal turbine shaft; and a plurality of paired cam lobes evenly spaced around said cam perimeter;

a plurality of paired cylinders arrayed radially around said plurality of annular cams, each of said plurality of paired cylinders having two adjacent pistons each engaged with one of said plurality of annular cams and having a cylinder interior having a cylinder axis disposed normal to said channeling means and extending toward said turbine shaft;

a proximate cylinder end surrounding said cylinder axis and in fluid communication with said channeling means; and a distal cylinder end substantially radial to one of said plurality of annular cams;

a piston journaled within said cylinder interior, said piston having a piston head disposed normal to said cylinder axis and adapted to articulate between said proximate cylinder end and said distal cylinder end, said piston head dividing said cylinder into an upper piston pressurizing chamber above said piston head and adjacent said proximate cylinder end and a lower piston chamber below said piston head and adjacent said distal cylinder end;

a piston rod having a proximate piston rod end coupled to said piston head and a distal piston rod end; and piston footer means disposed on said distal piston rod end and in mechanical engagement with said cam means;

a transfer pressure line coupled between and in fluid communication with each of said adjacent pistons, said transfer pressure line adapted to transfer hydraulic fluid from one to another of said paired cylinders; and a linear transducer disposed on each of said piston heads and adapted to transmit piston length of travel data of said piston heads within said cylinders;

a piston positioning manifold coupled to each of said plurality of cylinders through said channeling means, said piston positioning manifold having a first channel fluidly coupled to said upper piston pressurizing chamber;

a second channel fluidly coupled to said lower piston chamber; and a bi-directional impeller disposed between said first channel and said second channel and adapted to direct hydraulic fluid from one of said first and second channels into the other of said first and second channels; and a controller adapted to gather said piston length of travel data from said linear transducers;

calculate a difference between said length of travel data between said pistons articulating within said paired cylinders; and direct said piston positioning manifold to operate said bi-directional impeller to withdraw hydraulic fluid from said lower piston chamber of one of said pair of cylinders and to direct a like amount of hydraulic fluid into said upper piston pressurizing chamber of said other of said pair of cylinders wherein said channeling means further comprises;

a plurality of pressure manifolds disposed parallel to said longitudinal turbine shaft and in fluid communication with one of said plurality of paired cylinders for each of said plurality of annular cams and said generator drive motor;

a plurality of return manifolds disposed parallel to said longitudinal turbine shaft and in fluid communication with said generator drive motor and one of said plurality of paired cylinders for each of said plurality of annular cams, whereby said pressure and return manifolds surround and define a hydraulic drive pump interior adapted to contain a quantity of hydraulic fluid surrounding and in contact with said plurality of paired cylinders.

2. The hydraulic drive pump of claim 1 and further comprising a pressure tank disposed within said drive pump interior and in fluid communication with said plurality of pressure manifolds and said generator drive motor, said pressure tank adapted to receive pressurized hydraulic fluid from said pressure manifolds and to stabilize said pressure of said hydraulic fluid for said generator drive motor.

3. The hydraulic drive pump of claim 2 wherein
said pressure tank is toroidal in shape and journaled within said drive pump coaxial with said turbine shaft.

4. The hydraulic drive pump of claim 1 wherein said piston footer means comprises
a footer fluid reservoir disposed on said distal piston rod end;
a plurality of knuckle pistons coupled to said footer fluid reservoir and extending toward said cam perimeter, each of said knuckle pistons surrounding and defining a knuckle piston conduit in fluid communication with said footer fluid reservoir and said cam perimeter; and
a footer shoe disposed between said plurality of knuckle pistons and said cam perimeter, said footer shoe adapted to slide along said cam perimeter on a film of hydraulic fluid from said knuckle pistons.

5. A hydraulic drive pump for a wind turbine, the wind turbine having a nacelle disposed atop a support tower, said nacelle surrounding and containing at least one generator coupled to a generator drive motor, said generator drive motor coupled to a longitudinal turbine shaft extending outside said nacelle to couple to an air foil, the hydraulic drive pump comprising
a plurality of pressure manifolds disposed parallel to said longitudinal turbine shaft and in fluid communication with said generator drive motor;
a plurality of return manifolds disposed parallel to said longitudinal turbine shaft and in fluid communication with said generator drive motor, said pressure and return manifolds surrounding and defining a hydraulic drive pump interior of said hydraulic drive pump adapted to contain a quantity of hydraulic fluid surrounding and in contact with said cylinder means;
a plurality of annular cams disposed within said hydraulic drive pump interior coaxial with and mechanically coupled to said longitudinal turbine shaft, each of said plurality of annular cams having
a cam perimeter surrounding and radially distal said longitudinal turbine shaft; and
a plurality of paired cam lobes evenly spaced around said cam perimeter;
a plurality of paired cylinders arrayed radially around said plurality of annular cams, each of said plurality of paired cylinders having two adjacent pistons engaged with one of said plurality of annular cams, each of said paired cylinders further having
a cylinder interior surrounding a cylinder axis extending from said pressure and return manifolds toward said turbine shaft;
a piston journaled within said cylinder interior and having
a piston head disposed normal to said cylinder axis and dividing said cylinder into an upper chamber above said piston head and a lower chamber below said piston head;
a piston rod having a proximate shaft end coupled to said piston head and a distal piston rod end; and
piston footer means disposed on said distal piston rod end and in mechanical engagement with one of said plurality of annular cams; and
a transfer pressure line coupled between and in fluid communication with each of said adjacent pistons, said transfer pressure line adapted to transfer hydraulic fluid from one to another of said paired cylinders;
a linear transducer disposed on each of said piston heads and adapted to transmit piston length of travel data of said piston heads;
a piston positioning manifold coupled to each of said plurality of cylinders through said plurality of pressure manifolds, said piston positioning manifold having
a first channel fluidly coupled to said upper piston chamber;
a second channel fluidly coupled to said lower piston chamber; and
a bi-directional impeller disposed between said first channel and said second channel and adapted to direct hydraulic fluid from one of said first and second channels into the other;
a controller adapted to
gather said piston length of travel data from said linear transducers;
calculate a difference between said length of travel data between said pistons articulating within said paired piston cylinders; and
direct said piston positioning manifold to operate said bi-directional impeller to withdraw hydraulic fluid from said lower chamber of one of said pair of cylinders and to direct a like amount of hydraulic fluid into said upper piston pressurizing chamber of said other of said pair of cylinders to reduce said difference between said length of travel data.

6. The hydraulic drive pump of claim 5 wherein said piston footer means comprises
a footer fluid reservoir disposed on said distal piston rod end;
a plurality of knuckle pistons coupled to said footer fluid reservoir and extending toward said cam perimeter, each of said knuckle pistons surrounding and defining a knuckle piston conduit in fluid communication with said footer fluid reservoir and said cam perimeter; and
a footer shoe disposed between said plurality of knuckle pistons within said cam width, said footer shoe adapted to slide along said cam perimeter on a film of hydraulic fluid from said knuckle pistons.

7. The hydraulic drive pump of claim 5 wherein
each of said plurality of paired cylinders is in fluid engagement with one each of said pressure manifolds and said return manifolds.

8. The hydraulic drive pump of claim 5 wherein
said two adjacent pistons are adapted to articulate between a power stroke and a return stroke in opposing phased relation to each other.

9. The hydraulic drive pump of claim 5 wherein
each of said plurality of paired cylinders is in fluid engagement with one each of said pressure manifolds and said return manifolds; and
said two adjacent pistons are adapted to articulate between a power stroke and a return stroke in opposing phased relation to each other.

10. A method of operating a generator for a wind turbine, said wind turbine having a nacelle disposed atop a support tower and surrounding a longitudinal turbine shaft coupled to an air foil, said nacelle further containing said generator coupled to a hydraulic motor, the method comprising
providing a hydraulic pump drive coupled between said longitudinal turbine shaft and said hydraulic motor, said pump drive having
channeling means surrounding and coaxial with said longitudinal turbine shaft for channeling pressurized hydraulic fluid between said generator drive motor and said hydraulic drive pump;
a plurality of annular cams coaxial with and mechanically coupled to said longitudinal turbine shaft, each of said plurality of annular cams having a cam perimeter surrounding and radially distal said longitudinal turbine shaft; and
a plurality of paired cam lobes evenly spaced around said cam perimeter;
a plurality of paired cylinders arrayed radially around said plurality of annular cams, each of said plurality of paired cylinders having two adjacent pistons engaged with one of said annular cams, each of said cylinders further having
a cylinder interior surrounding a cylinder axis;
a piston journaled within said cylinder interior and having
a piston head dividing said cylinder into an upper chamber above said piston head and a lower chamber below said piston head;
a piston rod having a proximate piston rod end coupled to said piston head and a distal piston rod end in mechanical engagement with said annular cam; and
piston footer means disposed on said distal piston rod end; and
a transfer pressure line coupled between and in fluid communication with each of said adjacent pistons, said transfer pressure line adapted to transfer hydraulic fluid from one to another of said paired cylinders;
providing a piston positioning manifold coupled to each of said plurality of cylinders through said channeling means, said piston positioning manifold having
a first channel fluidly coupled to said upper chamber;
a second channel fluidly coupled to said lower chamber;
a bi-directional impeller disposed between said first channel and said second channel and adapted to direct hydraulic fluid from one of said first and second channels into the other;
providing a linear transducer disposed on each of said piston heads and adapted to transmit piston length of travel data of said piston heads;
providing a controller adapted to
gather said piston length of travel data from said linear transducers;
calculate any difference between said length of travel data between said pistons articulating within said paired cylinders; and
direct said piston positioning manifold to operate said bi-directional impeller to withdraw hydraulic fluid from said lower chamber of said pair of cylinders and to direct a like amount of hydraulic fluid into said upper chamber of said other of said pair of cylinders to reduce said difference between said length of travel data;
then
operating said hydraulic drive pump to impel pressurized hydraulic fluid through said channeling means toward said hydraulic motor to drive said generator;
receiving hydraulic fluid returning through said channeling means and directing it into an interior of said hydraulic drive pump;
operating said controller to adjust hydraulic pressure in said cylinders to compensate for slip between two adjacent pistons within said plurality of paired cylinders; and
evoking said piston positioning manifold to adjust the amount of hydraulic fluid flowing into said cylinders whereby said piston footer means selectably engages said annular cam as needed to pressurize hydraulic fluid within said hydraulic motor.

11. A hydraulic drive pump for a wind turbine, the wind turbine having a nacelle disposed atop a support tower, said nacelle surrounding and containing at least one generator coupled to a generator drive motor coupled to a longitudinal turbine shaft extending outside said nacelle to couple to an air foil, the hydraulic drive pump comprising
channeling means surrounding and coaxial with said longitudinal turbine shaft for channeling pressurized hydraulic fluid between said generator drive motor and said hydraulic drive pump;
a plurality of annular cams coaxial with and mechanically coupled to said longitudinal turbine shaft;
a plurality of paired cylinders arrayed radially around said plurality of annular cams, each cylinder of said plurality of paired cylinders having a piston engaged with one of said plurality of annular cams, each piston bearing a piston head dividing said cylinder into an upper chamber and a lower chamber;
a piston position monitor coupled to each of said pistons and adapted to transmit length of travel data of said piston head within said cylinder;
a piston positioning manifold coupled to each of said plurality of paired cylinders and having a bi-directional impeller coupled to each of said upper and lower chambers of said paired cylinders; and
a controller adapted to compare said length of travel data between pistons of said paired cylinders and to direct said piston positioning manifold to regulate the amount of hydraulic fluid within each of said upper and lower chambers.

12. The hydraulic drive pump of claim 11 wherein said piston position monitor comprises
a linear transducer disposed on each of said piston heads.

13. A hydraulic drive pump for a wind turbine, the wind turbine having a nacelle disposed atop a support tower, said nacelle surrounding and containing at least one generator coupled to a generator drive motor coupled to a longitudinal turbine shaft extending outside said nacelle to couple to an air foil, the hydraulic drive pump comprising
channeling means surrounding and coaxial with said longitudinal turbine shaft for channeling pressurized hydraulic fluid between said generator drive motor and said hydraulic drive pump,
a plurality of annular cams coaxial with and mechanically coupled to said longitudinal turbine shaft;
a plurality of paired cylinders arrayed radially around said plurality of annular cams, each cylinder of said plurality of paired cylinders having a piston engaged with one of said plurality of annular cams, each piston bearing a piston head dividing said cylinder into an upper chamber and a lower chamber;
a transfer pressure line coupled between and in fluid communication with each of said adjacent pistons, said transfer pressure line adapted to transfer hydraulic fluid from one to another of said paired cylinders;
a linear transducer disposed on each of said piston heads and adapted to transmit piston length of travel data of said piston heads within said cylinders;
a piston positioning manifold coupled to each of said plurality of cylinders through said channeling means, said piston positioning manifold having
a first channel fluidly coupled to said upper piston chamber;
a second channel fluidly coupled to said lower piston chamber; and
a bi-directional impeller disposed between said first channel and said second channel and adapted to direct hydraulic fluid from one of said first and second channels into the other of said first and second channels; and a controller adapted to gather said piston length of travel data from said linear transducers;

calculate a difference between said length of travel data between said pistons articulating within said paired cylinders; and direct said piston positioning manifold to operate said bi-directional impeller to withdraw hydraulic fluid from said lower piston chamber of one of said pair of cylinders and to direct a like amount of hydraulic fluid into said upper piston pressurizing chamber of said other of said pair of cylinders.

* * * * *